United States Patent
Wan et al.

(10) Patent No.: US 6,240,288 B1
(45) Date of Patent: May 29, 2001

(54) POWER MANAGEMENT SYSTEM FOR A MOBILE UNIT BY INTELLIGENT PAGE MONITORING

(75) Inventors: Yongbing Wan; Jaleh Komaili, both of Irvine; David O. Anderton, Rancho Santa Margarita; Earl C. Cox, La Crescenta, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/056,572

(22) Filed: Apr. 7, 1998

(51) Int. Cl.⁷ .................................................. H04Q 7/20
(52) U.S. Cl. .......................... 455/426; 455/31.2; 455/567
(58) Field of Search ................................. 455/458, 38.3, 455/31.2, 31.3, 567, 574; 340/825.44

(56) References Cited

U.S. PATENT DOCUMENTS

| | | | |
|---|---|---|---|
| 5,144,296 | * 9/1992 | DeLuca et al. | 340/825.44 |
| 5,301,225 | 4/1994 | Suzuki et al. | |
| 5,574,996 | * 11/1996 | Raith | 455/343 X |
| 5,826,173 | * 10/1998 | Dent | 455/38.3 |
| 5,835,023 | * 11/1998 | Ito et al. | 340/825.44 |
| 5,842,141 | * 11/1998 | Vaihoja et al. | 455/574 |
| 5,991,635 | * 11/1999 | Dent et al. | 455/517 |
| 6,044,069 | * 3/2000 | Wan | 370/311 |
| 6,111,865 | * 8/2000 | Butler et al. | 455/31.3 X |

FOREIGN PATENT DOCUMENTS

| | | |
|---|---|---|
| 0 642 234 A1 | 3/1995 | (EP) . |
| 0 892 507 A1 | 10/1997 | (EP) . |
| 04241528 | 8/1992 | (JP) . |
| 05327586 | 12/1993 | (JP) . |
| 97/36386 | * 10/1997 | (WO) . |

OTHER PUBLICATIONS

Sigmund M. Redl et al., "An Introduction to GSM", pp. 19–105.

* cited by examiner

*Primary Examiner*—Nay Maung
(74) *Attorney, Agent, or Firm*—Knobbe, Martens, Olson & Bear, LLP

(57) ABSTRACT

A power management system for a mobile unit wherein the frequency of detecting a paging message may be controlled. The quality of the signal transmitted by a base station and the acceptable delay are determined by the mobile unit. The mobile unit compares these factors to the current paging message monitoring rate. If a further delay is acceptable, the present invention inhibits monitoring of at least one cycle of the paging message. Each cycle of the paging message inhibited conserves battery power in the mobile unit. The mobile unit also includes a technique for the user to disable the power savings feature.

6 Claims, 9 Drawing Sheets

BASE STATION

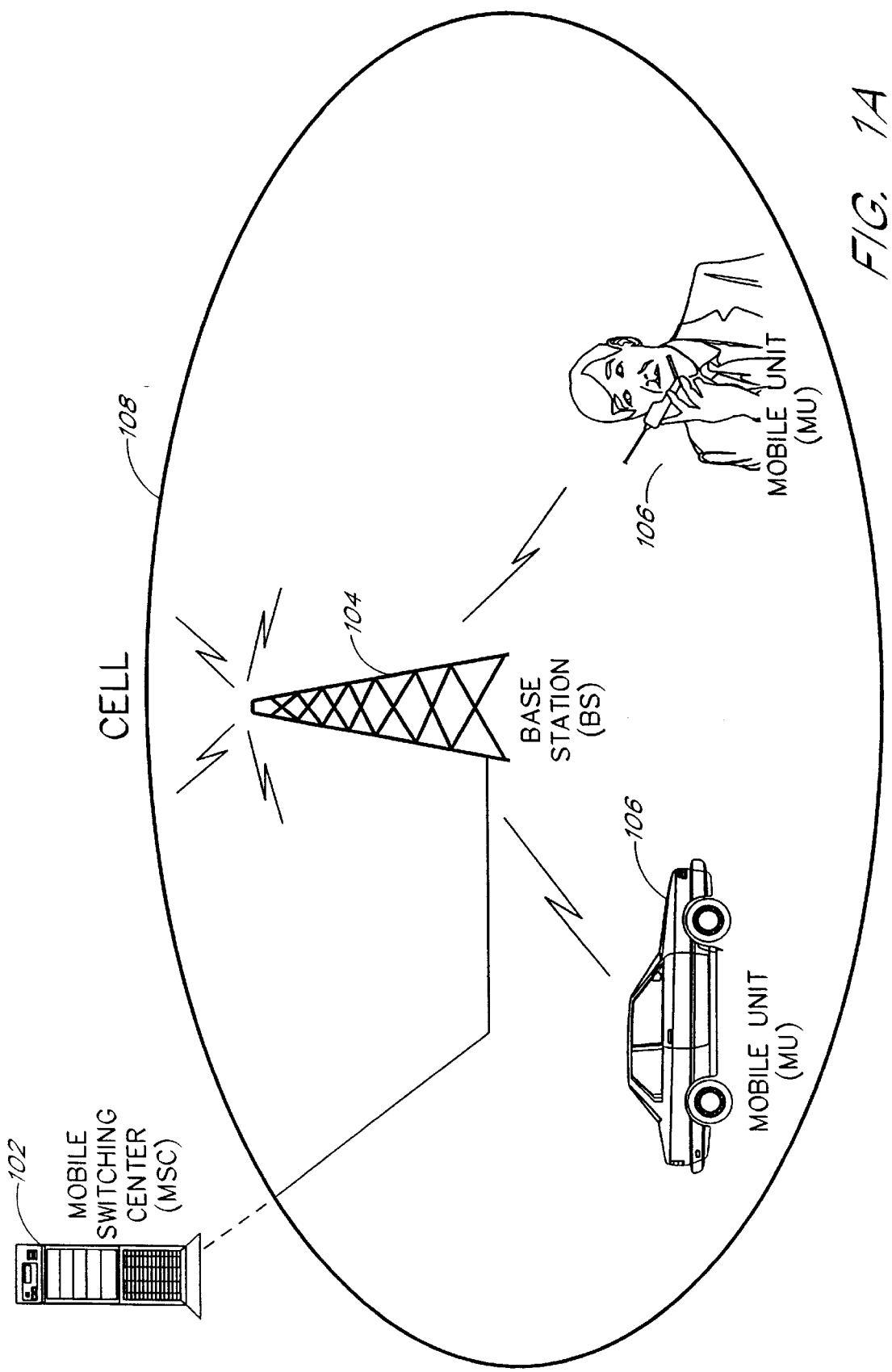

POWER MANAGEMENT SYSTEM FOR A MOBILE UNIT BY INTELLIGENT PAGE MONITORING

BACKGROUND

1. Field of the Invention

This invention relates to the field of wireless communication systems. More specifically, the present invention relates to a power management system for mobile stations.

2. Description of the Related Art

The use of wireless communication systems is growing with users now numbering well into the millions. However, one inconvenience associated with routine use of a mobile unit is the constant need to recharge and replace depleted batteries. Even users who make and receive very few telephone calls wherein their mobile units operate mostly in a standby mode (awaiting calls) experience the annoying and frequent problem of depleted battery power.

A large portion of battery power consumed in common standby modes is attributable to call detection processing. For example, in the Global System for Mobile Communications (GSM) wireless communication networks, about once every second, a mobile unit receives and decodes a paging message. The mobile unit processes the paging message to detect in-coming calls. Only rarely does the detection attempt result in discovery of an in-coming call. Unfortunately, a great deal of battery power is consumed in this call detection process.

Base stations transmit paging messages to mobile units based upon the number of mobile units in the base station's area of service. Frequently paging the mobile units reduces the time required to detect an in-coming call. Thus, one reason to frequently page a mobile unit is to minimize the delay between routing a call from the base station to the mobile unit.

As with any transmitted signal, the quality of the signal received by the mobile unit varies based upon a number of factors, including atmospheric conditions, location of the mobile unit, or interference by terrain or buildings. If a paging message received by the mobile unit has degraded, the mobile unit may be unable to decode and process the message. For example, atmospheric conditions may degrade the signal prior to reaching the mobile unit, or the mobile unit may be at the outer transmission boundary of the base station.

Base stations therefore retransmit each paging message multiple times to ensure the mobile station eventually receives a good signal. The number of times the base station retransmits the paging message varies depending upon the service provider. Thus, frequently retransmitting paging messages reduces the delay caused by transmission errors.

In conventional systems, the base station establishes the frequency the paging messages are sent to the mobile units. The frequency which a base station sends paging messages to a mobile unit is related in part to the number of mobile units and in part to the number of times paging messages are retransmitted. For example, if a base station is serving only a few mobile units, the base station may be able to send a paging message to each mobile unit more often. However, if the base station is serving a large number of mobile units, it may take more time to send paging messages to each mobile unit. Likewise, if a base station retransmits a paging message multiple times, it may take more time to send paging messages to each mobile unit.

Improvements in battery technology, while helpful, have done little to avoid the seemingly ever-present need to recharge and replace mobile unit batteries. What is needed is a system to conserve battery power by minimizing the power consumed when processing paging messages.

SUMMARY

The present invention is directed to reducing power consumed by a mobile unit. The present information reduces the frequency the mobile unit processes paging messages. Reduced paging message detection consumes less power and advantageously increases the standby mode lifetime of a mobile unit battery.

In one embodiment, the present invention detects the quality of the signals transmitted by the base station. Based on the signal quality, the mobile unit determines the likelihood of receiving a clear signal. If the signal strength is strong, the mobile unit detects the paging message less often.

One embodiment of the present invention also detects the frequency the base station transmits paging messages to the mobile unit. If the base station is paging the mobile unit on a regular basis, the mobile unit may inhibit paging messages. This allows the mobile unit to conserve energy while ensuring paging messages are detected.

Sometimes a mobile unit is not being powered by a battery. For example, a mobile unit may be installed in an automobile and be powered by the automobile. In this case, the user may prefer to bypass the present invention. Therefore, one embodiment of the present invention includes a bypass option selectable by the user to override the power saving mode.

In an embodiment of the present invention, a wireless communication system comprises a mobile unit and a base station which transmits signals including a series of paging messages to the mobile unit. Each of the series of paging messages indicates whether a call is pending to the mobile unit, and the base station determines how frequently to transmit one of the series of paging messages to the mobile unit. A signal strength detector in the mobile unit determines the quality of the signals received by the mobile unit. A paging message inhibitor inhibits the mobile unit from checking the paging message for at least one paging cycle when the quality of the signals and the repaging rate exceeds predetermined levels.

Another embodiment of the present invention is a method of conserving power in a wireless communication system comprising the acts of determining the page monitoring rate from a base station and determining the quality of signals received from the base station. The page monitoring rate and signal quality are compared to a set of predetermined values and cycles of page monitoring are inhibited when the page monitoring rate and signal quality exceeds one of the set of predetermined values.

Another embodiment of the present invention is a wireless communication system comprising a signal strength indicator which determines the quality of a signal received by a mobile unit. A page inhibitor then causes a mobile unit to inhibit detection of at least one paging message from a base station when the signal quality exceeds a set value.

Another embodiment of the present invention is a wireless communication system comprising a signal strength indicator which determines the quality of a signal received by a mobile unit. A page inhibitor then causes a mobile unit to inhibit detection of at least one paging message from a base station when the repaging rate exceeds a set value.

Another embodiment of the present invention is a method of saving power in a communications system which provides for the transmission of a message a plurality of times comprising the acts of determining the quality of received signals and inhibiting the detection of at least one repeating message based upon the quality of the received signals.

Another embodiment of the present invention is a method of saving power in a communications system which provides for the transmission of a message a plurality of times comprising the acts of determining the quality of received signals and inhibiting the detection of at least one repeating message based upon the repaging rate.

Another embodiment of the present invention is a wireless communication system comprising means for determining the quality of a signal received and means for inhibiting detection of at least one paging message from the base station when the signal quality exceeds a set value.

Another embodiment of the present invention is a wireless communication system comprising means for determining the quality of a signal received and means for inhibiting detection of at least one paging message from the base station when the repaging rate exceeds a set value.

BRIEF DESCRIPTION OF THE DRAWINGS

These and other features and advantages of the invention will become more apparent upon reading the following detailed description and upon reference to the accompanying drawings.

FIG. 1A illustrates components of a wireless communication system.

DETAILED DESCRIPTION

Figure 1B:
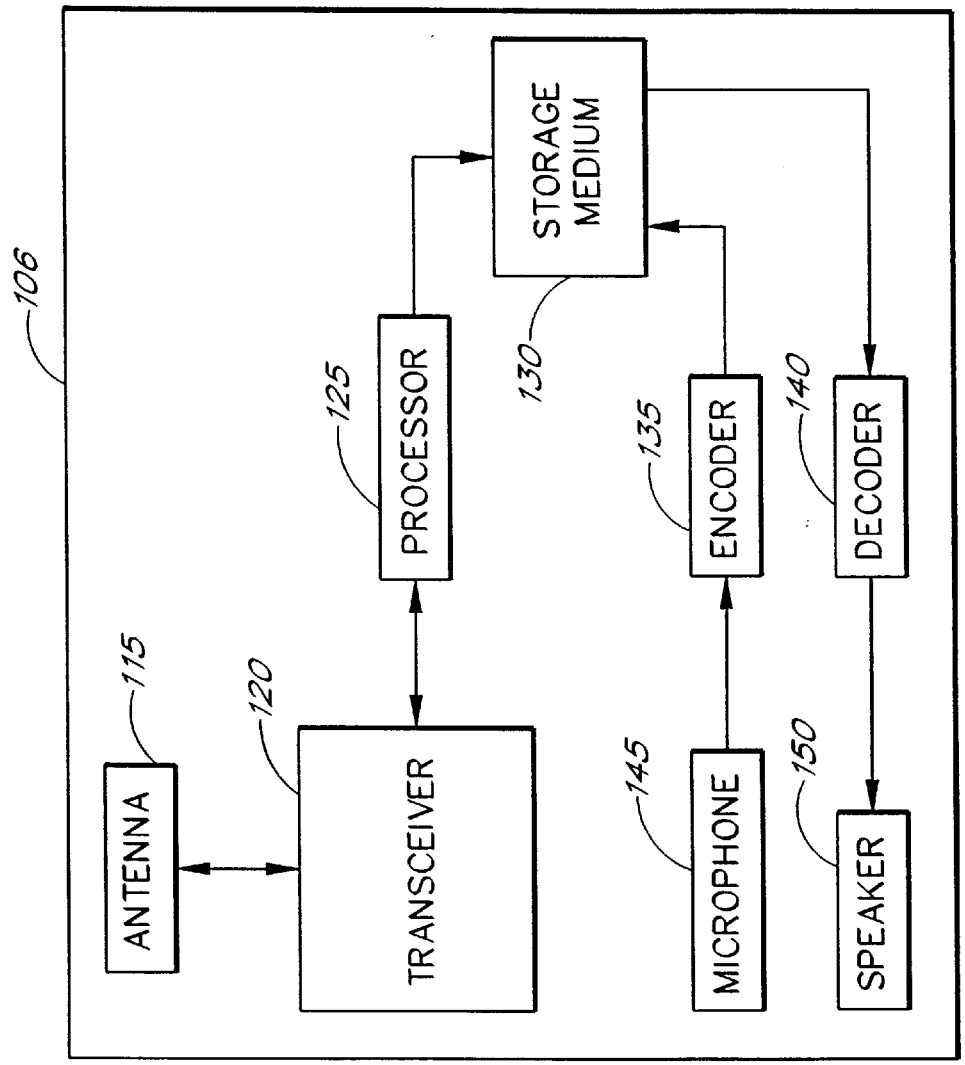
FIG. 1B illustrates a block diagram of a mobile unit according to the present invention.

FIG. 1A illustrates components of a wireless communication system. A mobile switching center 102 communicates with a base station 104. The base station 104 broadcasts data to and receives data from mobile units 106 within a cell 108. The cell 108 is a geographic region, roughly hexagonal, having a radius of up to 35 kilometers or possibly more.

A mobile unit 106 is capable of receiving data from and transmitting data to a base station 104 in compliance with the Global System for Mobile communications (GSM). GSM is a communication standard permitting mobile users of wireless communication devices to exchange data over a telephone system wherein radio signals carry data to and from the wireless devices.

Under the GSM standard, additional cells adjacent to the cell 108 permit mobile units 106 to cross cell boundaries without interrupting communications. This is so because base stations 104 in adjacent cells assume the task of transmitting and receiving data for the mobile units 106. The mobile switching center 102 coordinates all communication to and from mobile units 106 in a multi-cell region, thus the mobile switching center 102 may communicate with many base stations 104.

Mobile units 106 may move about freely within the cell 108 while communicating either voice or data. Mobile units 106 not in active communication with other telephone system users may, nevertheless, scan base station 104 transmissions in the cell 108 to detect any telephone calls or paging messages directed to the mobile unit 106.

One example of such a mobile unit 106 is a cellular telephone used by a pedestrian who, expecting a telephone call, powers on the cellular telephone while walking in the cell 108. The cellular telephone scans certain frequencies (frequencies known to be used by GSM) to synchronize communication with the base station 104. The cellular telephone then registers with the mobile switching center 102 to make itself known as an active user within the GSM network.

As discussed in further detail below, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile unit identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

The receiving and processing of paging message information to detect telephone calls and paging messages consumes power. Millions of consumers use mobile units 106, such as portable, hand-held cellular telephones, that rely on batteries for power. Even consumers who initiate and receive relatively few telephone calls on their cellular telephones must frequently recharge and replace batteries because of the power consumed by the cellular telephone while in standby operation (waiting for an incoming call).

The present invention substantially reduces the power consumed by a cellular telephone (or other mobile unit) to detect telephone calls or paging messages and consequently increases battery lifetime. To reduce power consumption, one embodiment of the present invention does not check each paging message sent by the base station. Rather, the mobile unit 106 detects the signal quality and if the quality is sufficient, skips a number of paging cycles. Advantageously, the embodiment substantially reduces call detection processing and extends the lifetime of a single battery charge.

A common implementation of the GSM system uses frequencies in the 900-MHz range. In particular, mobile units 106 transmit in the 890–915-MHz range and base stations 104 transmit in the higher 935–960-MHz range. Each 25-MHz range is divided into 125 radio frequency channels, each having a width of 200 kHz. The direction of communication from a mobile unit 106 to a base station 104 is referred to as uplink, and the direction from a base station 104 to a mobile unit 106 is referred to as downlink.

FIG. 1B illustrates one embodiment of a mobile unit 106 according to one embodiment of the present invention. The mobile unit 106 downlinks the signals from the base station 104 at a transceiver 120 via an antenna 115. The transceiver 120 may also uplink information to the base station 104. Alternatively, a separate receiver and transmitter may be used in place of the transceiver 120. After receiving the signals, the transceiver 120 relays the signals to a processor 125. In one embodiment, a microprocessor performs the function of the processor 125. Of course, other types of processors may be used including conventional general purpose single- or multi-chip microprocessors, digital signal processors, embedded microprocessors, microcontrollers and the like.

The processor 125 converts the signals into data and performs the functions requested by the signal. This may include an indication that a call is pending. The mobile unit 106 may inform the user of a pending call by a variety of methods, including ringing, vibrating or flashing lights. During the pendency of a call, the data transmitted and received by the mobile unit 106 may include voice and data.

The data created by the processor 125 may be temporarily or permanently stored in a storage medium 130. The storage medium 130 may comprise any method of storing information. For example, the storage medium 130 may comprise an electrically erasable programmable read-only memory (EEPROM), read-only memory (ROM), random access memory (RAM), hard disks, floppy disks, laser disc players, digital video devices, compact discs, video tapes, audio tapes, magnetic recording tracks, and other techniques to store data.

The data from the storage medium 130 may be transmitted through a decoder 140 to a speaker 150. The decoder 140 may comprise a digital-to-analog converter or the like. The decoded data may then be played through the speaker 150 to be heard by the user.

The user may also direct voice into the microphone 145 of the mobile unit 106. The voice data passes through an encoder 135 and may be stored by the storage medium 130 prior to processing by the processor 125. The encoder 135 may comprise an analog-to-digital converter or the like. The processor 125 maintains two-way communication with the transceiver 125, and therefore the voice data may be sent from the mobile unit 106 to the base station 104.

Figure 2:
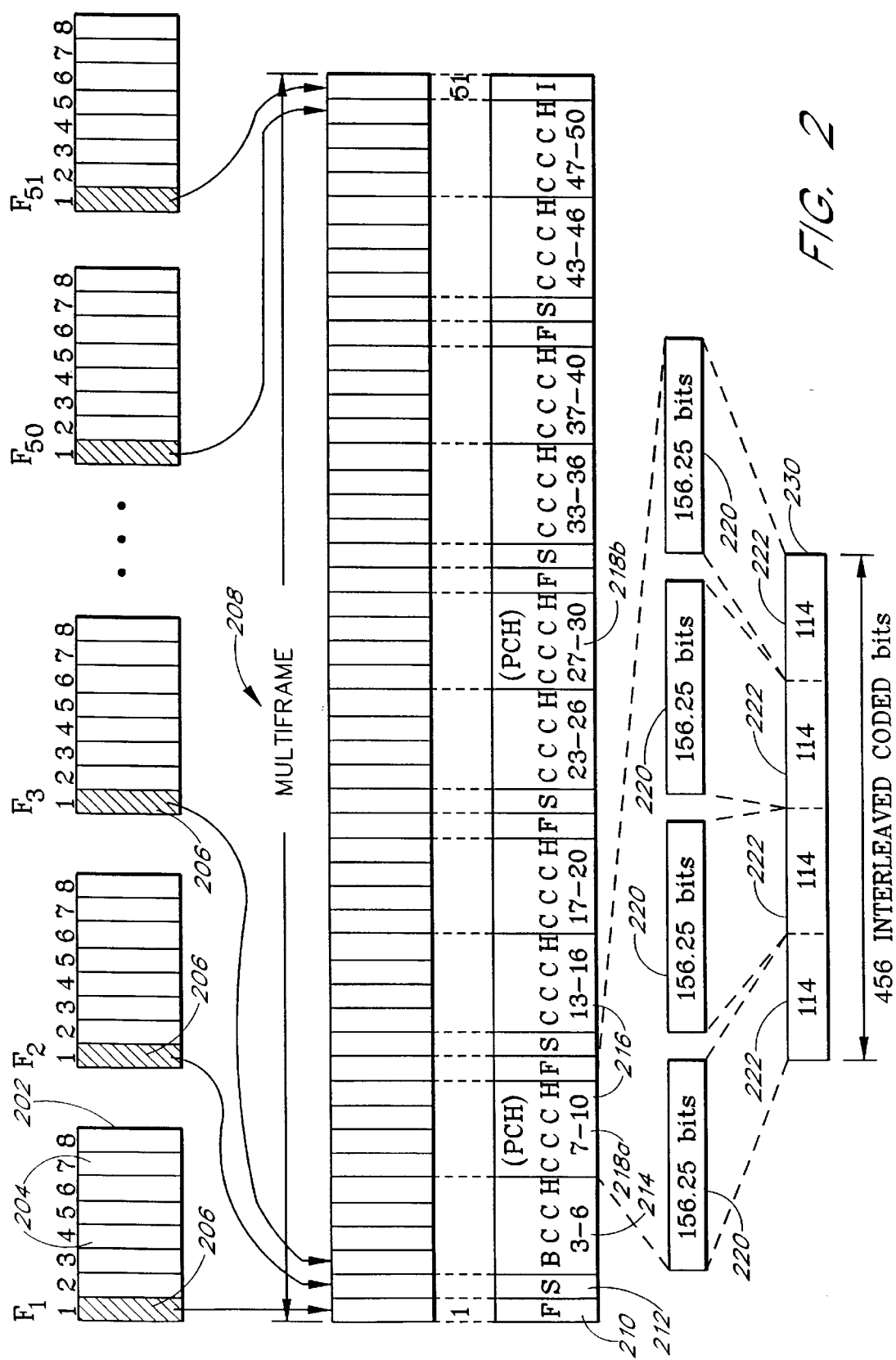
FIG. 2 illustrates wireless communication signal data transmitted by a base station and structured in data frames.

FIG. 2 illustrates wireless communication signal data transmitted by a base station 104 and structured in data frames, sometimes called time-division multiple access (TDMA) frames, according to the GSM standard. TDMA is a type of multiplexing where two or more channels of information are transmitted over the same link by allocating a different time interval ("slot" or "slice") for the transmission of each channel. That is, the channels take turns to use the link. Of course, the present invention is not limited to the GSM standard or TDMA frames, and may include systems using code-division multiple access, statistical time division multiplexing, spread spectrum, single communications channel or the like. For ease of understanding, the present invention will be described with reference to a GSM based system.

The GSM specification provides eight time slots (or physical channels) in each 200 kHz radio channel. An entire data frame has a duration of 4.615 milliseconds. Each time slot has a time length of 577 microseconds (4,615/8=577). Because a mobile unit 106 may use only one time slot in any data frame, it must transmit any information within 577 microseconds.

As shown in FIG. 2, a data frame 202 has eight time slots 204 (or physical channels). The time slots 204 carry bit-oriented control information, voice information or data. Generally, the first time slot of each frame 206 holds bit-oriented control information. Control information is used in a GSM-based system to broadcast synchronization information to broadcast system parameters, to notify mobile units 106 of pending telephone calls or page messages, and to grant mobile units 106 access to other physical channels.

The time slots carrying control information are formatted in groups of 51 time slots (i.e., the first time slot of each of 51 successive frames) referred to as a multiframe 208. Downlink information transmitted to a mobile unit 106 by a base station 104 is formatted in multiframes 208. In accordance with the GSM standard, a multiframe 208 may include four types of control information: (1) a frequency correction channel 210 which provides the mobile unit 106 with the frequency reference of the GSM system; (2) a synchronization channel 212 which supplies the mobile unit with the key (or training sequence) it needs to be able to demodulate the information coming from the base station 104 and also contains a frame number, as well as the base transceiver station identity code; (3) a broadcast control channel 214 which informs the mobile unit 106 about specific system parameters it may need to identify the network or to gain access to the network (e.g., location area code, operator identification, information on which frequencies of the neighboring cells may be found, different cell options, and access to other parameters); and (4) a common control channel 216 which supports the establishment of a link between a mobile unit 106 and a base station 104.

A common control channel 216 may have different uses. A common control channel 216 may be a paging message 218a or 218b, referred to collectively as paging messages 218. The paging messages 218 provide information indicating whether a telephone call is currently pending for a particular mobile unit 106. A common control channel 216 may also be an access grant channel through which a mobile unit 106 acquires information identifying which channel to use for communication needs.

The frequency correction channel 210 and the synchronization channel 212 each consist of bit-oriented data in a single time slot. The broadcast control channel 214 uses four time slots to carry information. In addition, the common control channel 216 also uses four time slots to carry information. For example, a common control channel 216 used as a paging message 218 uses four time slots of bit-oriented data 220, each time slot 220 carrying 156.25 bits.

Figure 3:
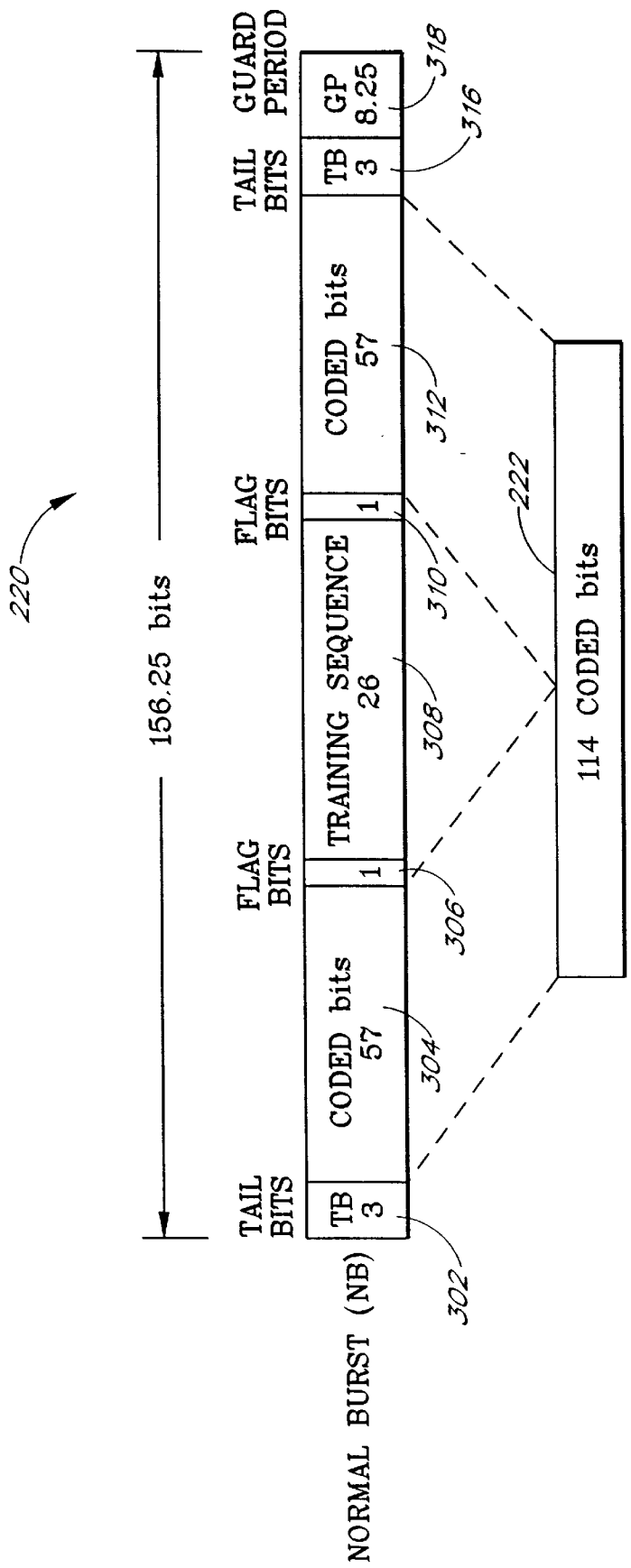
FIG. 3 illustrates a mapping of bits in a single paging message time slot.

FIG. 3 illustrates a mapping of each time slot 220 containing 156.25 bits of bit-oriented data comprising a portion of a single paging message 218. As provided in the GSM specification, bits in a paging message 218 time slot 220 may be allocated as follows: three tail bits 302, followed by 57 coded bits 304, followed by one flag bit 306, followed by 26 training sequence bits 308, followed by one flag bit 310, followed by 57 coded bits 312, followed by three tail bits 316, and terminated by an 8.25-bit guard period 318. The guard period represents a period of time, approximately 30.4 microseconds, during which a mobile unit ramps up radio frequency (RF) power, and typically information is not conveyed by the guard period. The tail bits 302, 316 are also used to provide guard time and facilitate additional time for RF power ramping. The flag bits 306, 310 and the training sequence bits 308 contain no actual paging message 218 information, and instead are used for synchronization.

The paging message 218 information is contained in the first 57 coded bits 304 and the second 57 coded bits 312 combine to form 114 coded bits 222. Thus, there are 114 coded bits 222 representing the paging message 218 information in each time slot 220 of a paging message 218. As FIG. 2 illustrates, the four time slots 220 of a paging message 218 carry four groups of 114 coded bits 222, resulting in a total of 456 coded bits 230 per paging message 218.

Figure 4:
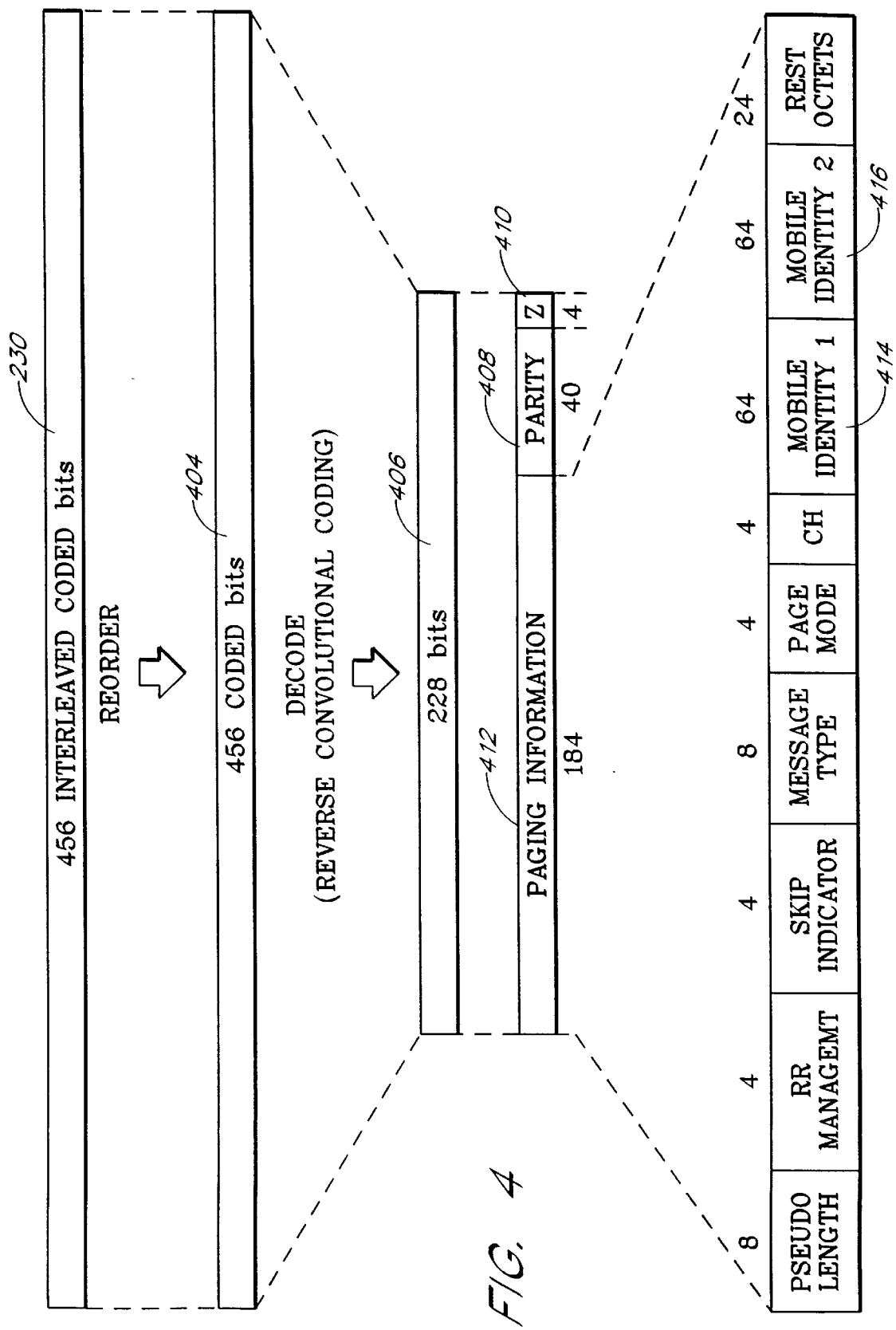
FIG. 4 illustrates a mapping of bits in a paging message.

FIG. 4 illustrates the mapping of the 456 coded bits 230 carried by each paging message 218. Those of ordinary skill in the art will appreciate that the 456 coded bits 230 of the paging message 218 are interleaved. Generally, bit-oriented data may be interleaved to assist in detection and correction of transmission-related errors in received bit-oriented data. The interleaving of bit-oriented data is well known and is further discussed in Siegmund M. Redl, et al., *An Introduction to GSM*, 123 (1995) which is hereby incorporated in its entirety herein. Meaningful information cannot be extracted from interleaved data, such as the 456 interleaved coded bits 230, until they are reordered. Because of the nature of the interleaving, it will be appreciated that the 456 interleaved coded bits 230 cannot be reordered until all of the 456 interleaved coded bits 230 have been received and stored by a mobile unit 106.

Under the GSM standard, a mobile unit 106 typically receives four time slots 220 of bit-oriented data in a paging message 218, comprising a total of 625 bits (4*156.25=625). Using known techniques, the mobile unit 106: (1) eliminates the tail bits 302, 316, the flag bits 306, 310, the training sequence bits 308, and the guard period bits 318 from the bits of each time slot 220 to isolate the 456 interleaved coded bits 230; (2) reorders the 456 interleaved coded bits 230 yielding a bit stream comprising 456 coded bits 404; and (3) decodes the 456 coded bits 404 to reverse the convolutional coding performed prior to transmission of the paging message 218 information to derive 228 bits 406.

The decoded 228 bits 406 include 40 parity bits 408 to verify that the paging information has been received correctly and four zero bits 410 to reset a decoder. The mobile unit 106 accesses paging information 412 contained in 184 bits. In particular, a mobile unit 106 accesses either a first 64-bit mobile identity value 414 or a second 64-bit mobile identity value 416 (it is determined during initialization with the base station 104 whether the mobile unit 106 examines the first or second mobile identity) to determine whether a telephone call or paging message 218 was directed to the mobile unit 106.

The mobile unit 106 determines that a telephone call or paging message 218 is directed to the mobile unit 106 by comparing the accessed mobile identity value 414, 416 to an internally stored identification code. Thus, under GSM specifications, when the mobile identity value 414, 416 matches the internally stored identification code, the mobile unit 106 determines that a telephone call or paging message 218 was directed to the mobile unit 106.

The detection, processing and decoding of each paging message 218 consumes a considerable amount of battery power. One embodiment of the present invention saves battery power by decreasing the number of paging messages 218 decoded by the mobile unit 106.

Figure 5:
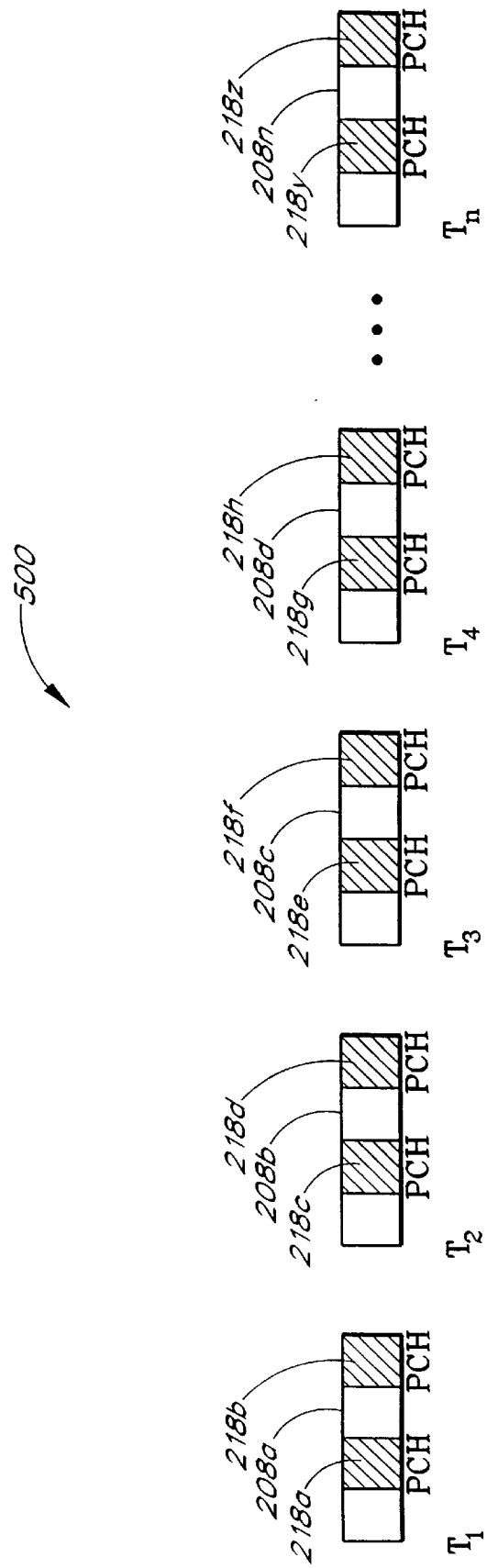
FIG. 5 illustrates a series of multiframes transmitted by a base station.

Communications comprising a series of multiframes 208 transmitted from the base station 104 to the mobile unit 106 are shown generally in FIG. 5. The series of multiframes 500 consists of a first multiframe 208a transmitted at time $T_1$, followed by a second multiframe 208b transmitted at time $T_2$. Multiframes are continuously transmitted to the mobile unit 106 as indicated by multiframes 208c at time $T_3$, multiframe 208d transmitted at time $T_4$, up to and including multiframe 208n transmitted at time $T_n$.

Each multiframe 208 transmitted may contain one or more paging messages 218 as directed by the GSM specification. As shown in multiframe 208a, two paging messages 218a and 218b, are transmitted within the multiframe 208a. Each subsequent multiframe 208b –208n also contain paging messages 218. When a mobile unit 106 initializes with the base station 104, the base station 104 transmits information indicating when and where to check for paging messages 218. For example, a mobile unit 106 may check the second paging message 218 of every second multiframe 208. This causes the mobile unit 106 to check paging message 218b in multiframe 208a, to skip multiframe 208b, and then to check paging message 218f in multiframe 208c. This pattern would continually repeat until the mobile unit 106 is disengaged or the base station 104 transmits information changing the periodic checking of the paging messages 218. The frequency with which the mobile unit 106 monitors a paging message 218 is known as the page-monitoring rate.

The base station 104 determines a page-monitoring rate based upon the loading of the base station 104. If the base station 104 is servicing a large number of mobile units 106, it may be necessary to have a low page monitoring rate so that each mobile unit only checks for a paging message 218 once every 8 or 9 multiframes 208. However, base stations 104 try to achieve the highest possible page monitoring rate to ensure calls are transmitted to the mobile units 106 as soon as possible. This minimizes the delay of transferring calls to the mobile unit 106.

Base stations 104 servicing only a few mobile units 106 typically establish a high page monitoring rate to cause the mobile units 106 to check paging messages 218 more frequently. When the page monitoring rate is high enough, the mobile units 106 may be checking for a paging message 218 approximately every second. Although this decreases the delay time in transferring a call from the mobile switching center 102 to the mobile unit 106, it does so at a cost of increased battery consumption.

One embodiment of the present invention enables the mobile unit 106 to identify the page monitoring rate and inhibit monitoring of certain paging cycles if the monitoring rate is high. This allows a user to selectively increase the delay time required to transfer a call to the mobile unit 106. Allowing this delay to be increased conserves battery power in the mobile unit 106.

In addition to identifying the page monitoring rate, the present invention determines the signal quality received by the mobile unit 106 and the number of times the base station 104 will repage the mobile unit 106. Each of these factors will be discussed in detail below. The combination of the page monitoring rate, the signal quality, and the number of repages allows the mobile unit 106 to determine an appropriate delay in checking between paging messages 218.

Figure 6:
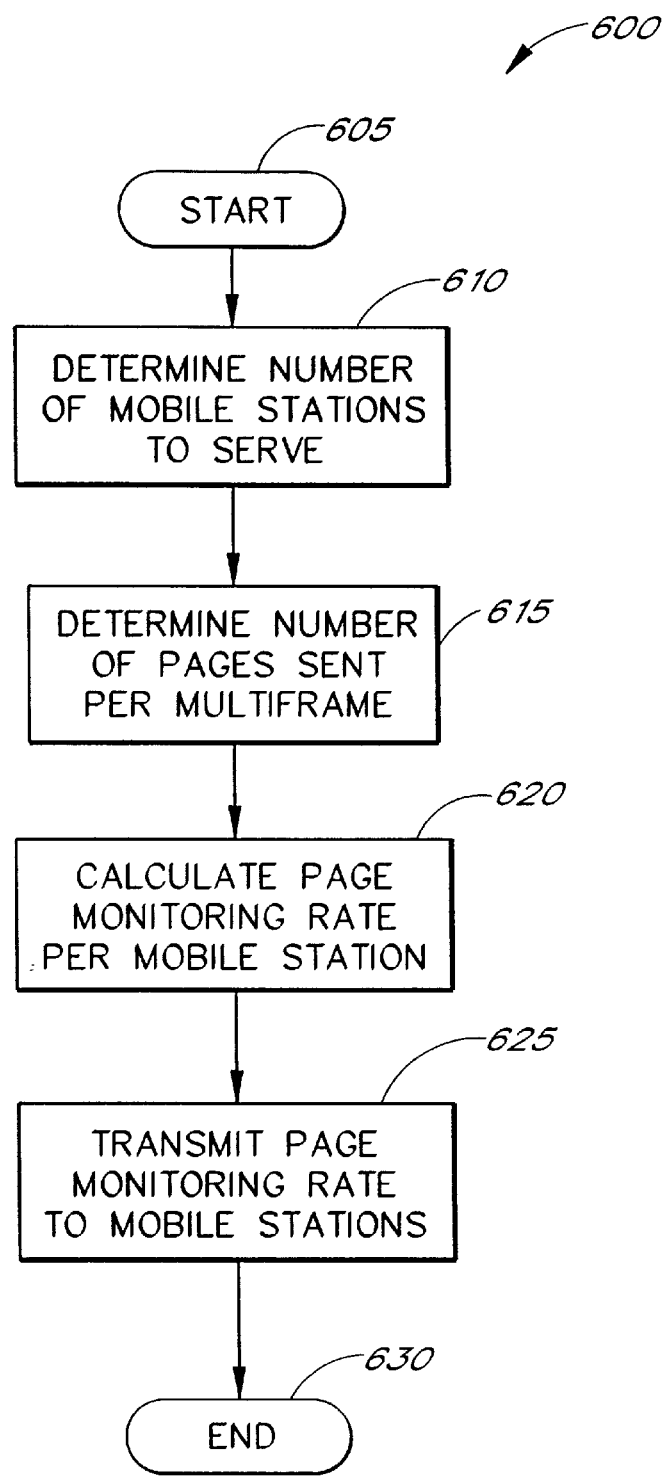
FIG. 6 illustrates acts performed by a base station to establish the page monitoring rate.

The process of establishing a page monitoring rate by a base station 104 is illustrated in FIG. 6. The process is shown generally by flowchart 600. The base station 104 initializes in a start state 605. Proceeding to state 610, the base station 104 determines the number of mobile units 106 being served. Each time a mobile unit 106 enters a cell 108 being served by the base station 104 or exits the cell 108 being served by the base station 104, the number of mobile units 106 being served changes. Therefore, the base station 104 may change the page monitoring rate over time.

Proceeding to state 615, the base station 104 determines the number of paging messages 218 sent out per multiframe 208. As discussed above, the number of paging messages 218 sent out per multiframe 208 may vary according to the communications specification used. In one embodiment of the invention, the GSM specification transmits two paging messages 218 per multiframe 208.

Proceeding to state 620, the base station 104 calculates a page monitoring rate for each mobile unit 106. The base station 104 establishes a page monitoring rate to ensure the minimum delay between paging messages 218 per each mobile unit 106.

Proceeding to state 625, the base station 104 transmits the page monitoring rate to the mobile units 106. In state 625, each mobile unit 106 also receives information to direct the mobile unit 106 as to which channel and paging message 218 to monitor. Once the base station 104 transmits the page monitoring rate, the determination and transmission of the page monitoring rate ends as indicated by end state 630. The base station 104 may periodically repeat the process in FIG. 6 to update the page monitoring rate. For example, a change in the number of mobile units 106 being served by the base station 104 may cause a change in the page monitoring rate.

Figure 7:
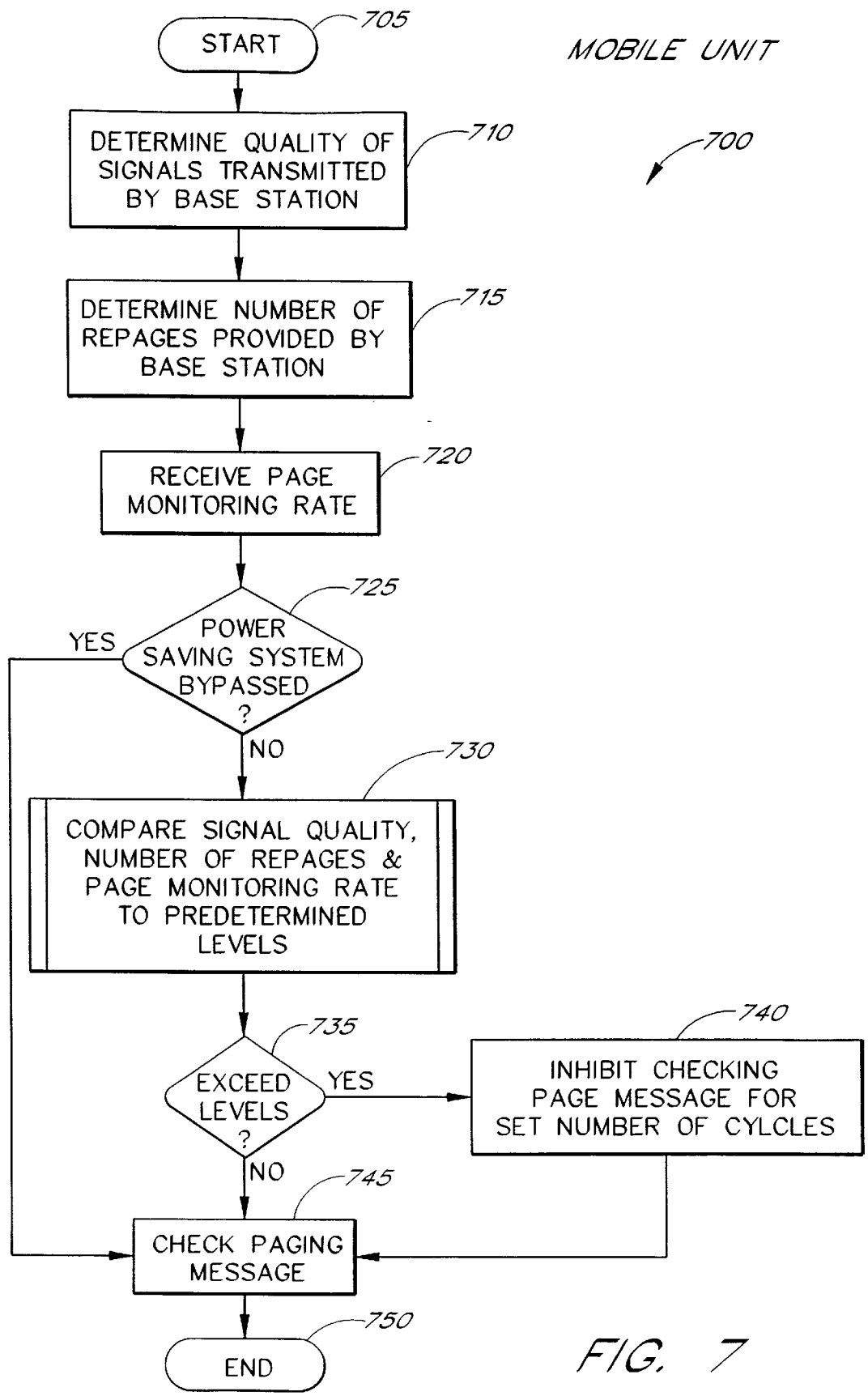
FIG. 7 illustrates acts performed by a mobile unit to determine if page message detection should be inhibited.

FIG. 7 illustrates the processes performed by the mobile unit 106 to determine whether to inhibit monitoring of a paging message 218. The process is shown generally by flowchart 700. The mobile unit 106 begins by initializing at a start state 705. Proceeding to state 710, the mobile unit 106 determines the quality of the signals received from the base station 104.

The mobile unit 106 uses a variety of indicators to determine signal quality. Among these indicators is a bit error rate, a receiver quality indicator (RX Quality), and a receive signal strength indicator (RSSI), known in the GSM and the digital cellular embodiment as RX Level. The mobile unit 106 uses these indicators to determine the signal quality. These indicators are well known and presently monitored by many mobile units 106.

In particular, the bit error rate is the number of erroneous bits in a data transmission. The RX Quality is a value assigned by the network indicating the quality of the received signal based upon the bit error rate. The RX Quality figure provides a mobile unit 106 with an expected measurement accuracy. The mobile unit 106 uses the RX Quality to determine the overall potential for error. The values assigned for RX Quality according to the GSM standard based upon the bit error rate are presented in Table 1.

TABLE 1

| RX Quality | Corresponding Bit Error Rate (%) | Range of Actual Bit Error Rate (%) | Expected MU-Reporting-Accuracy Probability (%) |
|---|---|---|---|
| 0 | Below 0.2 | Below 0.1 | 90 |
| 1 | 0.2 to 0.4 | 0.26 to 0.30 | 75 |
| 2 | 0.4 to 0.8 | 0.51 to 0.64 | 85 |
| 3 | 0.8 to 1.6 | 1.0 to 1.3 | 90 |
| 4 | 1.6 to 3.2 | 1.9 to 2.7 | 90 |
| 5 | 3.2 to 6.4 | 3.8 to 5.4 | 95 |
| 6 | 6.4 to 12.8 | 7.6 to 11.0 | 95 |
| 7 | Above 12.8 | Above 15 | 95 |

Another measurement that may be used by the mobile unit is RX Level (also known as RSSI in analog systems). RX Level provides a known value based upon the measured strength of the signal at the mobile unit 106. A stronger signal at the mobile unit 106 indicates less likelihood for error. Table 2 provides values for RX Level based upon the signal strength at the mobile unit 106. Each specific value for RX Level correlates to the strength of the signal (in measured decibels (dBm)) at the mobile unit (MU) 106 receiver.

TABLE 2

| RX Level | Level at MU Receiver (dBm) |
|---|---|
| 0 | Less than −110 |
| 1 | −110 to −109 |
| 2 | −109 to −108 |
| ... | ... |
| ... | ... |
| 62 | −49 to −48 |
| 63 | above −48 |

Using the indications of signal quality, the mobile unit 106 can determine the probability of receiving a usable signal. The probability of receiving a usable signal is useful for knowing how many signals need to be detected before ensuring a good signal is received. Any technique known to one skilled in the art to measure signal quality may be used without departing from the spirit of the invention.

Proceeding to state 715, the mobile unit 106 determines the number of repages generated by the base station 104. The number of repages a base station 104 transmits to each mobile unit 106 is established by the service provider. For example, a service provider may repages four times before determining there is no answer by the mobile unit 106.

If a particular service provider transmits a large number of repages before determining there is no answer by the mobile unit 106, then a greater number of paging messages 218 may be inhibited by the mobile unit 106. In contrast, a small number of repages provided by the base station 104 causes the mobile unit 106 to more frequently monitor the paging message 218.

Proceeding to state 720, the mobile unit 106 receives the page monitoring rate from the base station 104. Proceeding to state 725, the mobile unit 106 detects if the power saving system has been bypassed. In one embodiment of the present invention, the power saving mode of inhibiting monitoring of paging messages 218 may be selectively bypassed. The bypass may be done with a physical on/off switch, a software switch in the mobile unit 106 which can be selected from the keypad of the mobile unit 106, an option in the configuration file, or a flag stored in the memory of the mobile unit 106. The bypass may be configured by either the user or the manufacturer. Of course, other techniques for bypassing the power saving mode may be used as is known by those of skill in the art. These may include, among other things, an automatic bypass whenever an external power cord is attached to the mobile unit 106, or the ability of the user to deselect the power saving mode upon initially programming the mobile unit 106.

If the power saving system has been bypassed, the mobile unit 106 proceeds along the YES branch to state 745. In state 745, the mobile unit 106 checks the paging messages 218 provided by the base station 104 in a normal manner.

Alternatively, if the power saving system is active, the mobile unit 106 proceeds along the NO branch to state 730. In state 730, the mobile station 106 compares the signal quality, the number of repages and the page monitoring rate to a set of predetermined levels.

Figure 8:
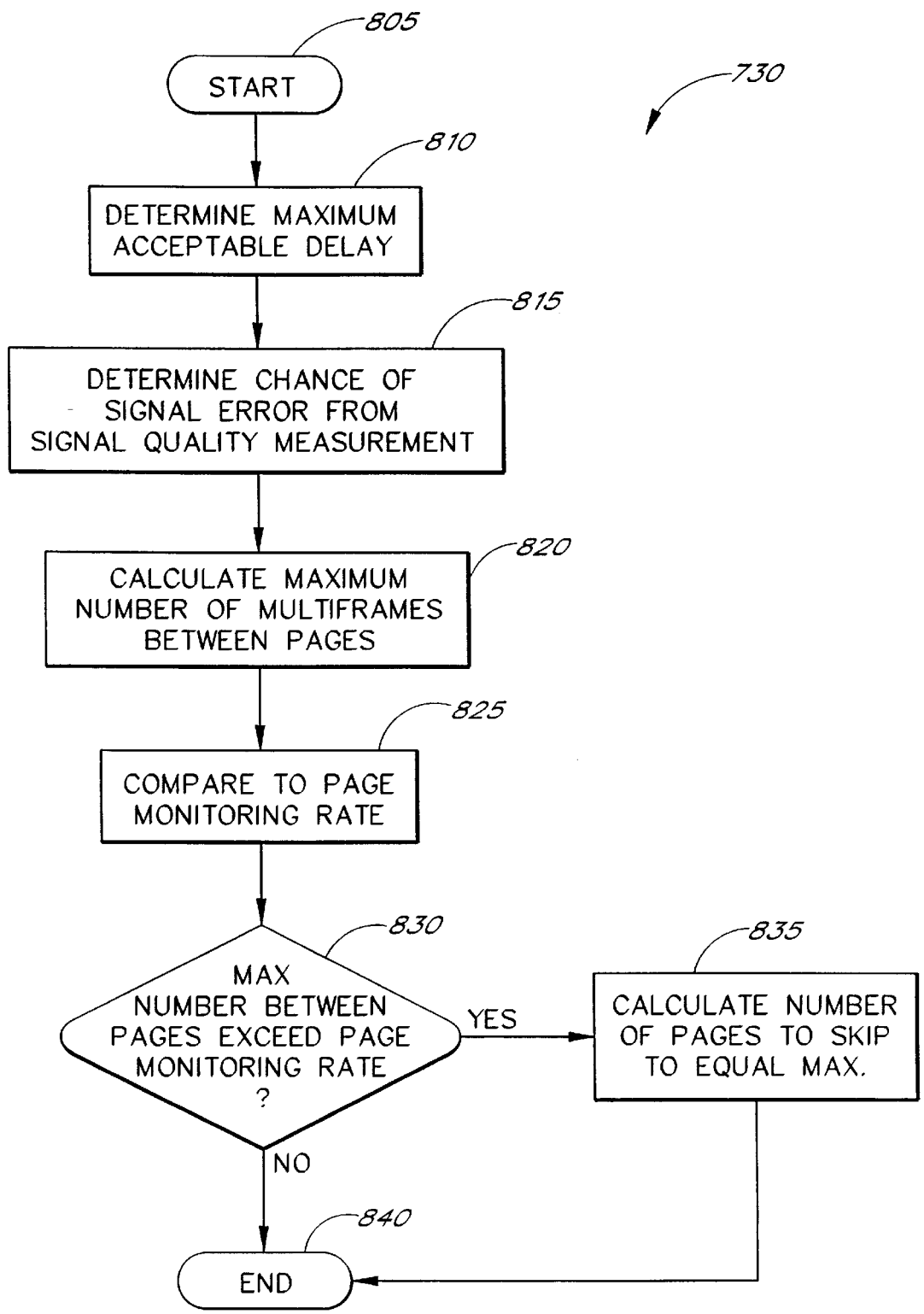
FIG. 8 illustrates acts performed by a mobile unit to calculate the number of paging messages to inhibit.

FIG. 8 illustrates the process used to perform the activities indicated by state 730 to compare the signal quality, number of repages and the page monitoring rate. The process begins at state 805. Proceeding to state 810, the mobile unit 106 determines the maximum acceptable delay in monitoring paging messages 218. The maximum acceptable delay is based upon the number of repages transmitted by the base station 104. The higher the number of repages transmitted, the longer the mobile unit 106 may delay in checking for a paging message 218.

Proceeding to state 815, the mobile unit 106 determines the chance of receiving a signal containing errors based upon the signal quality measurement. For example, if the signal quality measurements indicate that the mobile unit 106 will receive a clean signal 90% of the time, the mobile unit uses this value to determine how many cycles of page channel monitoring may be inhibited.

Proceeding to state 820, the number of multiframes 208 between paging messages 218 can be calculated. One formula to calculate the maximum number of multiframes between pages (MBP) using the maximum acceptable delay (Delay) and the probability of receiving a good signal (SigQual) is:

$$MBP=(Delay*SigQual)$$

Proceeding to state 825, the mobile unit 106 compares the MBP to the page monitoring rate. Proceeding to decision state 830, the mobile unit 106 then determines whether the maximum number of MBP exceeds the page monitoring rate. For example, if the page monitoring rate instructs the mobile unit 106 to monitor every second multiframe 208 for a paging message 218, and the maximum number of MBP is calculated to be ten, then four cycles of paging messages 218 can be inhibited without fear of missing a paging message 218.

If the MBP exceeds the page monitoring rate, the mobile unit 106 proceeds along the YES branch to state 835. In state 835, the mobile unit 106 calculates the number of pages to skip to equal the maximum number of MBP. In the above example, the mobile unit 106 inhibits four consecutive cycles of paging message 218 to monitor the paging message 218 at least once every ten multiframes 208. If the page monitoring rate was higher or lower, the number of cycles of paging messages 218 to skip would vary. After calculating the number of paging messages 218 to skip, the mobile unit 106 proceeds to end state 840.

If the maximum number between pages does not exceed the page monitoring rate, then the number of cycles skipped should be set to zero and the mobile unit 106 proceeds along the NO branch to end state 840.

Returning to FIG. 7, after processing the information in state 730, the mobile unit 106 proceeds to state 735. In state 735, the mobile unit 106 determines whether the signal quality, the number of repages, and the page monitoring rate exceeds predetermined levels. If the predetermined levels are not exceeded, then the mobile station 106 will not inhibit any checking of the paging messages 218. Therefore, the mobile unit 106 proceeds along the NO branch to state 745 and checks the paging messages 218 as normal.

Alternatively, if the predetermined levels are exceeded, the mobile unit 106 proceeds along the YES branch to state 740. In state 740, the mobile unit 106 inhibits checking of the paging messages 218 for a set number of cycles. The number of cycles in which checking for the paging message 218 is inhibited is determined by the signal quality, the number of repages, and the if page monitoring rate exceeds the predetermined levels.

Proceeding to state 745, the mobile unit 106 checks the next available paging message 218. The mobile unit then proceeds to end state 750 where this cycle of checking the paging messages 218 is ended.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A wireless communication system comprising:
   a mobile unit;
   a base station which transmits signals including paging messages to the mobile unit, each of the paging messages indicating whether a call is pending to the mobile unit, wherein the base station determines how frequently the paging messages are transmitted to the mobile unit and how many times each of the paging messages is repeated;
   a signal strength detector in the mobile unit which determines the quality of the signals received by the mobile unit; and
   a paging message inhibitor which inhibits the mobile unit from checking the paging messages for a period of time proportionate to the current signal quality and the number of times each of the paging messages is repeated.

2. The wireless communication system of claim 1, wherein the paging message inhibitor may be bypassed.

3. The wireless communication system of claim 1, wherein the number of paging cycles to be inhibited is dependent on a paging monitoring rate.

4. The wireless communication system of claim 1, wherein the signal strength detector measures the RSSI.

5. The wireless communication system of claim 1, wherein the signal strength detector measures the estimated frame-by-frame bit error rate.

6. The wireless communication system of claim 1, wherein the signal strength detector is based upon a parity check.

* * * * *